United States Patent [19]

Pagano et al.

[11] Patent Number: 4,996,546
[45] Date of Patent: Feb. 26, 1991

[54] CAMERA APPARATUS FOR MAGNETICALLY RECORDING ON FILM

[75] Inventors: Daniel M. Pagano, Henrietta; Robert P. Cloutier, Spencerport, both of N.Y.

[73] Assignee: Eastman Kodak Company, Rochester, N.Y.

[21] Appl. No.: 541,177

[22] Filed: Jun. 20, 1990

Related U.S. Application Data

[63] Continuation of Ser. No. 420,657, Oct. 11, 1989, abandoned, which is a continuation of Ser. No. 254,908, Oct. 7, 1988, abandoned.

[51] Int. Cl.$^5$ .............................................. G03B 17/24
[52] U.S. Cl. ...................................... 354/76; 354/105; 354/203
[58] Field of Search ................... 354/21, 105, 106, 75, 354/76, 203

[56] References Cited

U.S. PATENT DOCUMENTS

| | | | |
|---|---|---|---|
| 4,270,853 | 6/1981 | Hatada et al. | 354/76 |
| 4,270,854 | 6/1981 | Stemme et al. | 354/76 |
| 4,500,183 | 2/1985 | Tanikawa | 354/21 |
| 4,613,911 | 9/1986 | Ohta | 360/3 |
| 4,642,717 | 2/1987 | Matsuda et al. | 360/105 |
| 4,689,696 | 8/1987 | Plummer | 358/333 |
| 4,736,215 | 4/1988 | Hudspeth et al. | 354/21 |
| 4,843,414 | 6/1989 | Yoshina | 354/21 |
| 4,860,037 | 8/1989 | Harvey | 354/105 X |
| 4,864,332 | 9/1989 | Harvey | 354/105 X |

Primary Examiner—Michael L. Gellner
Attorney, Agent, or Firm—Roger A. Fields

[57] ABSTRACT

Magnetic recording apparatus for a photographic still camera comprises a fixed magnetic head mounted on a film platen. The head is adapted to contact a magnetic coating on the film adjacent the image area of the film. A pressure pad is mounted in the camera on the opposite side of the film and positioned in close proximity to the film. The pressure pad is biased by a spring to apply pressure on the head through pressure on the film to assure that the film is in intimate contact with the head when the film is advancing. During film exposure when the film is stationary, the pressure pad is retracted to avoid distortion of the image plane.

18 Claims, 5 Drawing Sheets

4,996,546

CAMERA APPARATUS FOR MAGNETICALLY RECORDING ON FILM

This is a continuation of application Ser. No. 07/420,657, filed Oct. 11, 1989, now abandoned, which is a continuation of application Ser. No. 254,908, filed Oct. 7, 1988, now abandoned.

CROSS REFERENCE TO RELATED APPLICATIONS

Reference is made to the following commonly assigned copending applications:

1. U.S. Ser. No. 254,914, entitled CAMERA APPARATUS FOR MAGNETICALLY RECORDING ON FILM, and filed Oct. 7, 1988 in the name of Richard R. Kelbe.

2. U.S. Ser. No. 254,906, entitled CAMERA APPARATUS FOR MAGNETICALLY RECORDING ON FILM, and filed Oct. 7, 1988 in the names of Michael L. Wash and Conrad Diehl.

3. U.S. Ser. No. 254,903, entitled CAMERA APPARATUS FOR MAGNETICALLY RECORDING ON FILM, and filed Oct. 7, 1988 in the names of Michael L. Wash and Christopher T. Mattson.

4. U.S. Ser. No. 255,693, entitled FILM INFORMATION EXCHANGE SYSTEM USING DEDICATED MAGNETIC TRACKS ON FILM and filed Oct. 7, 1988 in the name of Robert P. Cloutier et al.

5. U.S. Ser. No. 221,955, entitled MOTOR-DRIVEN FILM TRANSPORT APPARATUS, and filed July 20, 1988 in the name of Donald M. Harvey. U.S. Ser. No. 221,955 is incorporated into this application by reference.

6. U.S. Ser. No. 206,407, entitled, as amended, THREE PART DECODER CIRCUIT, and filed June 14, 1988 in the name of Michael L. Wash.

7. U.S. Ser. No. 206,408, entitled, as amended, THREE PART ENCODER CIRCUIT, and filed June 14, 1988 in the names of Arthur Whitfield and Michael L. Wash.

8. U.S. Ser. No. 206,553, entitled, as amended, THREE PART DECODER CIRCUIT, and filed June 14, 1988 in the name of Arthur Whitfield.

9. U.S. Ser. No. 206,646, entitled METHOD FOR MODULATING A BINARY DATA STREAM, and filed June 14, 1988 in the name of Michael L. Wash.

10. U.S. Ser. No. 254,907, entitled CAMERA APPARATUS FOR PREVENTING DOUBLE EXPOSURE and filed Oct. 7, 1988 in the name of James W. Cannon.

BACKGROUND OF THE INVENTION

This invention relates to magnetic recording apparatus for cameras and more particularly, to magnetic recording apparatus for photographic still cameras.

In commonly assigned copending application Ser. No. 255,693 entitled FILM INFORMATION EXCHANGE SYSTEM USING DEDICATED MAGNETIC TRACKS ON FILM, and filed Oct. 7, 1988 in the name of Robert P. Cloutier there is disclosed a photographic film having a virtually transparent magnetic coating covering the non-emulsion side of the film and dedicated recording areas on the coating for recording information such as film type, film speed, film exposure information and information relevant to the processing and subsequent use (e.g. printing) of the film. The system thus provides for recording of information during film manufacture, reading and/or recording of information during camera use, and reading and/or recording of printing related information during photofinishing. In the aforementioned copending application it is specifically proposed that camera information be recorded in spaced tracks preferably outside the image area along the edge of the film.

Reading and writing information on a magnetic coating or stripe on photographic film in a still camera requires solutions to problems different than those encountered in other apparatus. Perhaps the most significant problem is the space limitations in a portable hand held still camera which necessarily must be as compact and light as possible to appeal to the average customer. Perhaps equally significant, however, is the characteristics of photographic film relative to more common recording mediums such as magnetic tape. Because photographic films are stiffer then magnetic tape and have varying degrees of curl both in the longitudinal and transverse directions depending upon the base materials and number and nature of sensitizing layers and environmental conditions, they present unusual problems in reading and writing information on a magnetic coating or stripe. To provide a reliable read or write signal the magnetic head must remain in close proximity to the magnetic coating. Any disturbances such as variations in film curl can vary the relationship of the head to the coating and decrease the reliability of the signal.

Another problem unique to compact photographic still cameras is that film advance occurs in a short period of time with a limited amount of motion and does not allow the steady state conditions normally associated with magnetic recording. Recording and playback must take place during transient conditions which tend to separate the film from the recording head. For optimum magnetic recording during thee conditions, the magnetic head must maintain contact (i.e. within 10 micro-inches) with the magnetic coating.

Techniques for maintaining the desired relationship of the head to a magnetic coating in other apparatus, are not practical for use in a photographic still camera particularly a compact 35 mm camera. For example, in a sound movie camera, a film having a magnetic stripe along one edge is typically moved over a drum and information is recorded by a magnetic head positioned in close proximity to the drum. The drum provides a rigid support for the film, removes film curl and assures a uniform head to film relationship. While such a fixed support such as a sound drum produces satisfactory results, the space limitations in a photographic still camera render it impractical. Also, it is not suitable for the transient conditions described above.

Also, in a still camera system, it is desirable to record information pertinent to and coincident with images because negatives are cut up in photofinishing. In sound movie cameras, recorded information is displaced from the image to achieve continuous motion of the film during recording as compared with intermittent motion during exposure.

The prior art relating to recording on photographic film thus generally teaches providing a support for the recording medium on the side opposite from the recording head and continuous motion of the recording medium to ensure reliable recording.

In commonly assigned copending application Ser. No. 254,903, filed Oct. 7, 1988 in the names of Michael L. Wash and Christopher T. Mattson, a support on the other side of the film is provided by providing a recess in the cartridge film exit lip and positioning a magnetic head to engage a magnetic coating or stripe on the film within the recess so that the felt light-locking material and the lower side of the lip cooperate to provide a compliant support on the side of the film opposite to the recording head. While this structure provides a support of the type considered necessary in the prior art and is suitable for compact cameras it requires a special film cartridge.

SUMMARY OF THE INVENTION

In accordance with the invention, a photographic still camera has a magnetic head mounted in a film platen so as to engage the film during film transport. Such location and mounting of the head minimizes the space occupied by the recording head. A further feature of the invention is the provision of a pressure pad on the other side of the film from the head for engaging the film during film transport to hold it into contact with the head. During film exposure, the pad is retracted to avoid distorting the film plane.

BRIEF DESCRIPTION OF THE DRAWINGS

Other advantages of the invention will become apparent from the following description taken in connection with the accompanying drawings wherein.

DETAILED DESCRIPTION OF THE INVENTION

Figure 1:
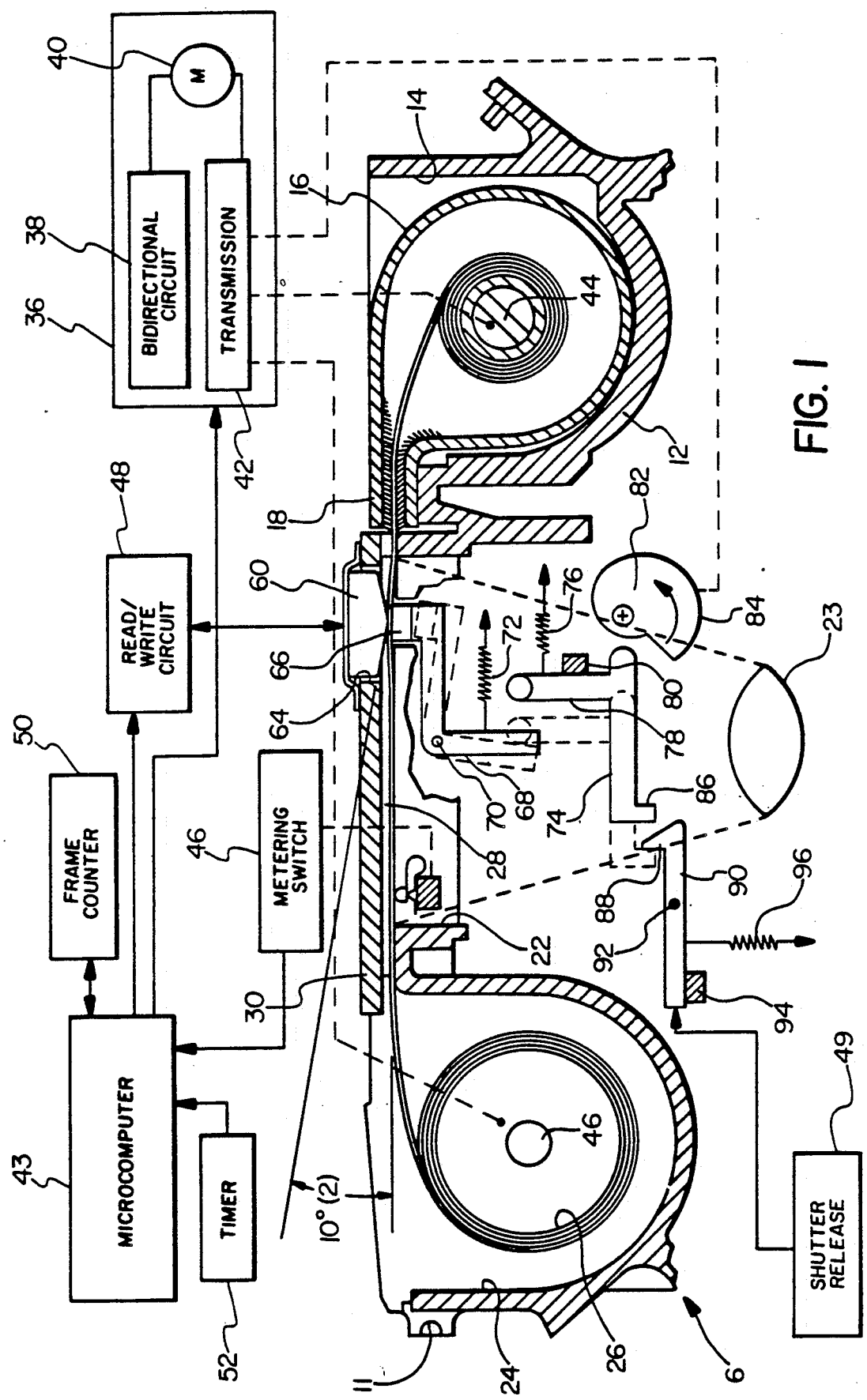
FIG. 1 is a cross section of a portion of a conventional photographic still camera illustrating a magnetic recording apparatus in accordance with the invention.
Figure 2:
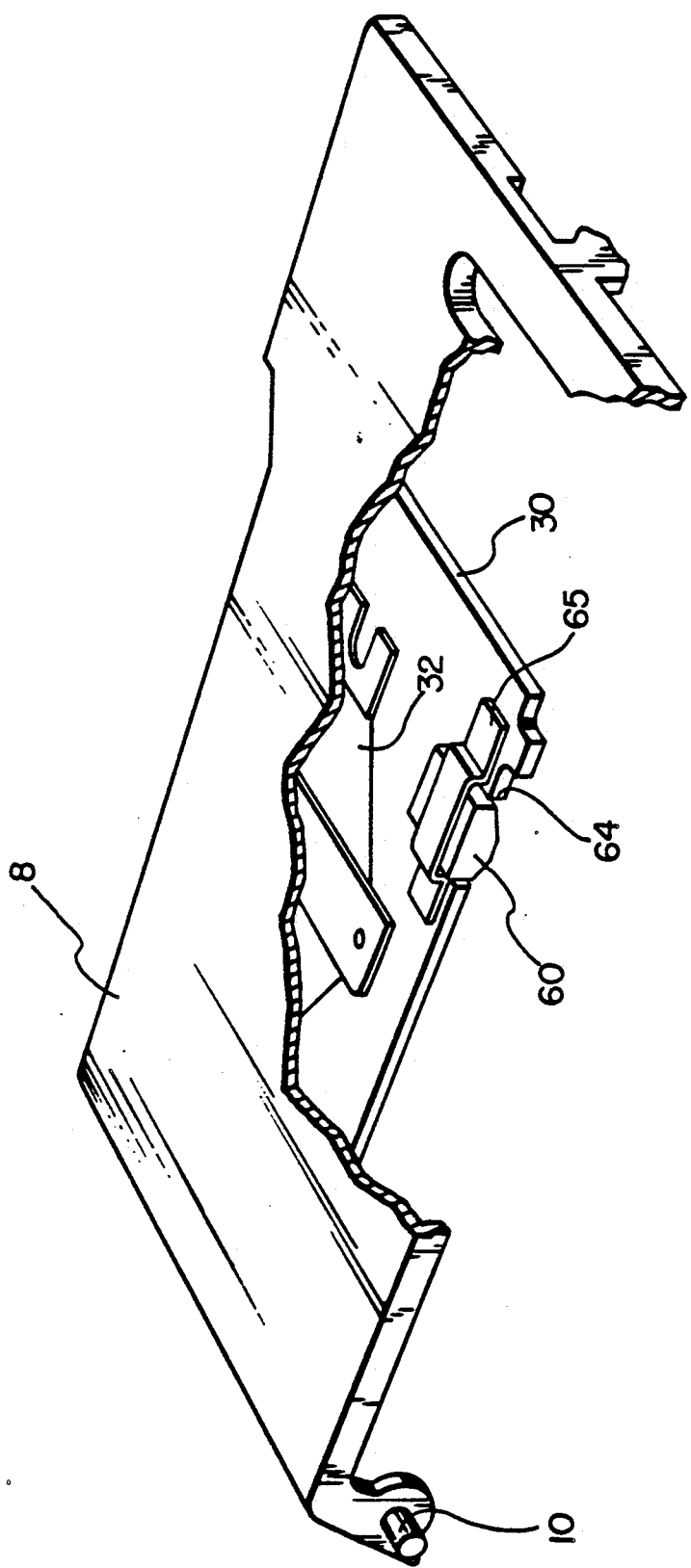
FIG. 2 is a perspective view of the back or rear door for the camera illustrated in FIG. 1.
Figure 3:
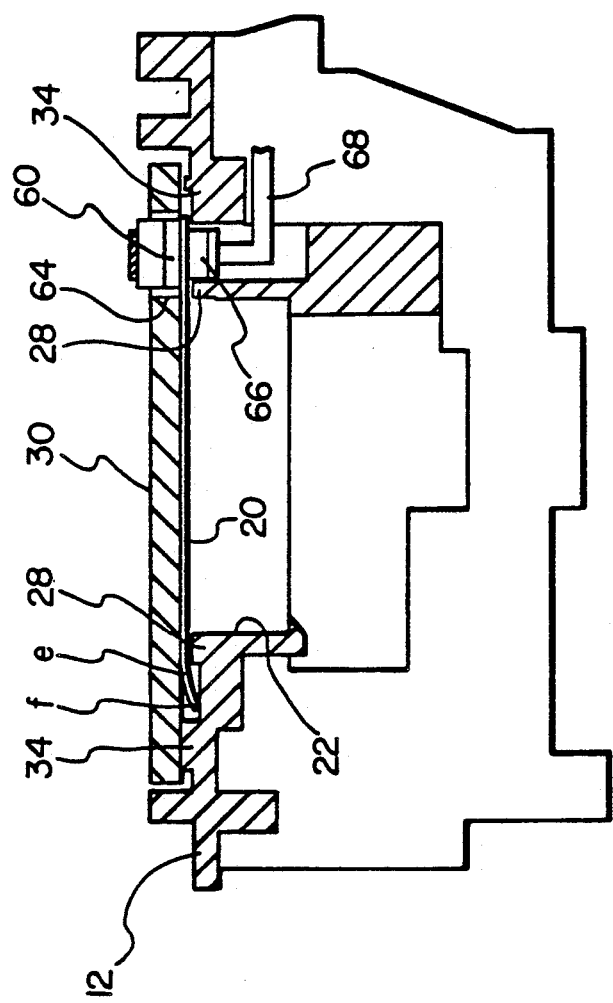
FIG. 3 is a cross section taken perpendicular to the section shown in FIG. 1.

Referring to FIGS. 1, 2 and 3 of the drawings, there is shown a portion of a typical photographic still camera 6 having a back or rear door 8 (FIG. 2) pivotal to an open position by means of a pair of pins 10 one of which is shown in FIG. 2. The pins 20 are received in holes 11 in frame 12. Since such camera are well known in the art, features not necessary for an understanding of the present invention have been omitted or shown in block diagram to simplify the disclosure. Also, the invention will be described with reference to a single magnetic head. However, it is to be understood that a camera can be provided with a plurality of heads for multi-tracks recording.

The camera 6 comprises a frame or housing 12 having a chamber 14 at one end thereof for receiving a film cartridge 16. The cartridge 16 which is shown more clearly in FIGS. 4 and 5, preferably takes the form of the film cartridge disclosed in the reference copending application U.S. Ser. No. 221,955 having a lip 18 from which a film 20 is removed for exposure. The film 20 is provided with a transparent magnetic coating 21 on its non-emulsion side, a single row of perforations (p) along one edge and dedicated longitudinal recording areas (r) along the edges outside the image area (i). As disclosed in copending application Ser. No. 255,693, filed Oct. 7, 1988 in the name of Robert P. Cloutier et al. and entitled FILM INFORMATION EXCHANGE SYSTEM USING DEDICATED MAGNETIC TRACKS ON FILM, the areas (r) would be dedicated areas for recording information in the camera, the image area being dedicated to the recording of photofinishing information.

It will be apparent, however, that the recording apparatus disclosed herein is equally applicable to magnetic coatings or stripes on conventional 35 mm film, and that the camera apparatus disclosed herein can alternatively be a conventional 35 mm camera such as the commercially available KODAK K-14 Medalist VR 35 camera.

Figure 4:
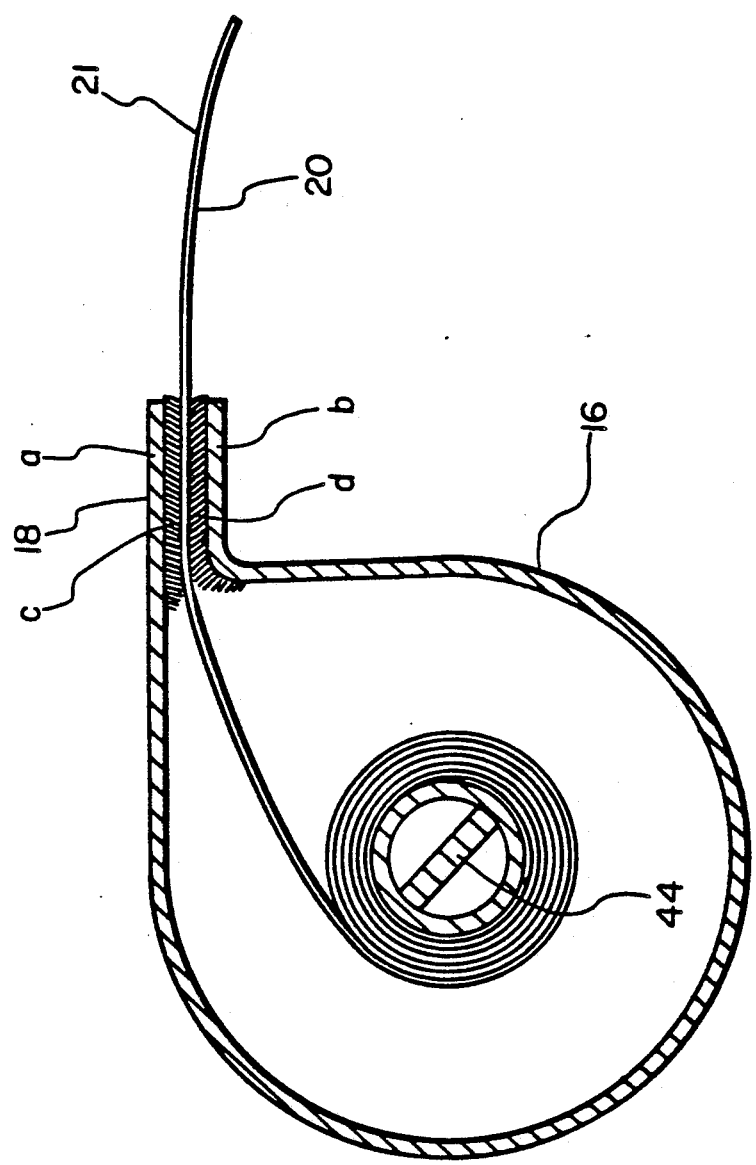
FIG. 4 is an enlarged cross section of a film cartridge.
Figure 5:
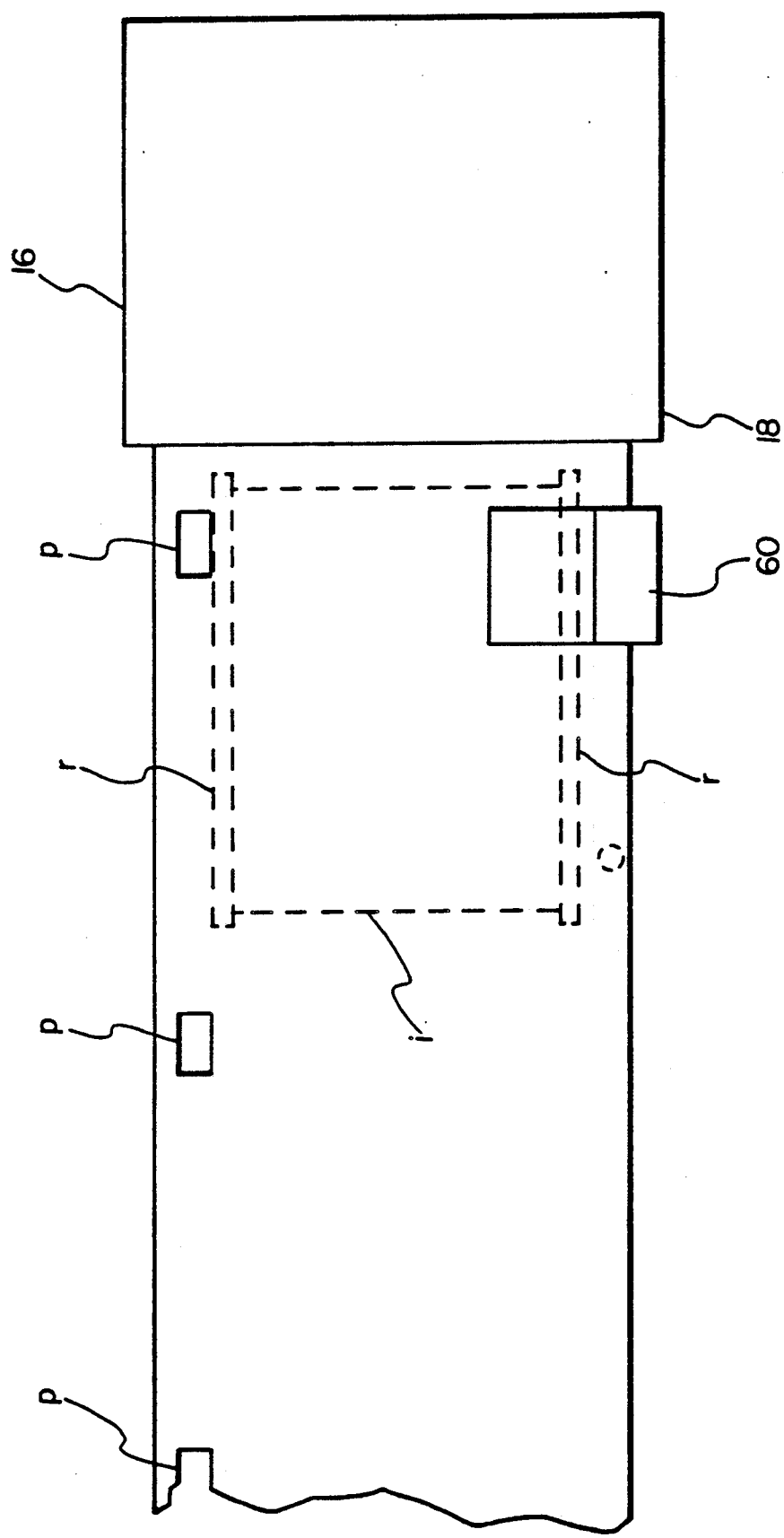
FIG. 5 is an enlarged top view of the film cartridge shown in FIG. 4 with the film partially withdrawn.

As shown in FIG. 4, the lip 18 comprises upper and lower spaced flanges (a) and (b) which serve to clamp upper and lower pieces of plush material (c) and (d) to opposite sides of the film.

As is well known in the art, the surfaces of cartridge 16 and lip 18 engage complimental surfaces of the chamber 14 and the camera back whereby when the camera back is closed, the cartridge is fixedly held in the orientation shown in FIG. 1. Since such camera and cartridge interface features are well known in the art, further description is deemed unnecessary.

From the lip 18, the film 20 is transported across a rectangular exposure opening 22 aligned with a taking lens 23 to a film take-up chamber 24 where it is wound on a take-up spool 26. Mechanisms for accomplishing such film transport are well known in the rat. Typically, they operate to advance the film frame by frame from the cartridge to the take-up spool or, if the camera exposes during rewind, frame by frame from the take-up spool to the cartridge.

A pair of film rails 28 are formed on opposite sides of the rectangular exposure opening 22 to engage the longitudinal edges of the film. The film 20 is urged toward the rails 28 by a platen 30 mounted on a leaf spring 32 on the camera back 8. The platen 30 comprises a flat rectangular plate having planar dimensions complimental to the rectangular exposure opening 22 whereby upon closure of the back, platen 30 will engage platen support surfaces 34, engage the film 20 an urge it with slight pressure toward rails 28 under the influence of spring 32 as shown more clearly in FIG. 3. The platen 30 will tend to remove longitudinal curl resulting from film core set in the cartridge 16 and some of the transverse curl across the film. However, since the film is unsupported transversely on its emulsion side, some transverse curl still exists during film exposure as indicated in FIG. 3 at areas (e) but not enough to noticeably degrade the image.

In a typical still camera, the spacing between the platen 20 and the rails 28 is in the range of 0.25–0.45 mm as a result of manufacturing tolerances. The photographic film used in such a camera is typically 0.15 mm thick. Accordingly, as shown in FIG. 3, the film may not actually engage the rails. Due to the transverse film curl, the extreme edges of the film may actually engage the camera surfaces (f) on the other side of the rails with the curl bias causing most of the width of the film to engage the platen. Because of this result, the camera lens is typically focused on a film plane next to the platen.

FIG. 1 also depicts in a block diagram some of the more basic central features of cameras of the type described. Typically, a motorized film transport means 36 comprising a conventional bi-directional circuit 38 for reversing a drive motor 40, a drive transmission 42 and drive hubs 44 and 46 which engage the core of film cartridge 16 and the take-up spool 26 respectively, is provided for rotating the spool core and the take-up spool either in the unwinding or winding directions under the control of a micro computer 43.

Other elements of the camera include a conventional metering switch 46, a read/write circuit 48, a shutter release mechanism 49, a conventional digital frame counter 50 and a conventional timer 52. These components are all controlled from the micro computer 43 in a manner well known in the art and since they form no part of the present invention, further description is deemed unnecessary.

As mentioned above, magnetic recording in photographic still cameras involves unique problems. Film advance occurs in a short period of time with a limited amount of motion and does not allow the steady conditions normally associated with magnetic recording to be achieved. In view of these problems, the read/write circuit 48 preferably utilizes the encoding and decoding techniques disclosed in the referenced commonly assigned copending applications U.S. Ser. No. 206,407, 206, 408 and 206,553, and the code format preferably takes the form of that disclosed in the referenced copending application Ser. No. 206,646.

In accordance with the invention, a conventional rectangular shaped magnetic read/write head 60 having a V-shaped bottom surface is connected to the read/write circuit 48. The head is retained in an opening 64 in platen 30 by a bracket 65 and is positioned so that when the camera back is closed, the head will engage the transparent magnetic coating of the film in the region adjacent the lip 18 of cartridge 16. The position of head 60 is adjusted so that when the camera back is closed the head will maintain slight contact (i.e. within 10 microinches) with the magnetic coating of film 20.

A complient circular pressure pad 66 formed from plush material and carried by a pivotal lever 68 is positioned below the magnetic head 60 and on the opposite side of the film from the head. The lever 68 is mounted on a pin 70 and biased counterclockwise by a spring 72 toward the position shown in solid lines to thus urge pressure pad 66 into engagement with film 20 with a bias force of 14–56 grams. A second lever 74 biased to the right by a spring 76 is mounted on the camera body for rectilinear movement. The lever 74 has an arm 78 which engages a stop 80 under the influence of spring 76. A cam 82 driven by the transmission 42 has a cam rise 84 which upon rotation of the cam 82 will engage lever 74 and displace it to the left to the position shown in dashed lines. During such movement, the arm 78 will engage and pivot lever 68 clockwise against the bias of spring 72. During such movement, the angled end 86 of lever 74 will move by the latch portion 88 of a pivotal lever 90 mounted on a pin 92 and raised into engagement with a stop 94 by a spring 96. The angled end 86 of the lever 74 will become latched in the position shown in solid lines and the lever 68 will be held in the position shown in dashed lines to hold pad 66 away from the film. The lever 90 can be subsequently rotated clockwise against the bias of spring 96 to release the lever 74 to permit the parts to return to the positions shown in solid lines.

In operation, the lever 68 will assume the position shown in solid lines to hold the pressure pad 66 into engagement with the film to urge the film into contact with the head 60 while the film is in motion. Near the end of advance of a film frame, rise 84 of cam 82 will engage lever 74 and displace it to the left until its angled end 86 is latched by latch 88. The parts will assume the positions shown in dotted lines and the pad 66 will now be displaced from the film. At the end of the film exposure frame, the shutter release mechanism will actuate lever 90 to release lever 74 so that the parts will again assume the position shown in solid lines during advancement of the next frame to an exposure position. The pad 66 is thus held into engagement with the film during film advancement to assure adequate magnetic coupling between the head and magnetic coating and released during film exposure to prevent distortion of the film plane. The apparatus thus achieves reliable recording in a photographic still camera without affecting image quality.

The advantages of the invention will now be apparent. By uniquely mounting the magnetic head on the film platen, the recording apparatus consumes minimal space within the camera and preserves camera compactness. This feature above produces a very desirable result.

Also, by retracting the head pressure pad during film exposure, distortion of the film plane by head/pad pressure is avoided. This permits adequate pressure to be applied to the film and head by the pressure pad during film advance to achieve reliable recording.

While the invention has been shown and described with reference to a preferred embodiment thereof, it will be apparent that various changes may be made without departing from the scope of the invention as defined by the appended claims.

We claim:

1. A photographic still camera for transporting a photographic film over an exposure opening to expose frames of the film, the film having a magnetic surface on one side for magnetically recording information on the film, said camera comprising:
   a camera body having an exposure opening;
   a film platen supported to engage the film and retain it in an exposure plane adjacent said opening; and
   a magnetic head mounted at said platen to engage the magnetic surface of said film in said plane.

2. A photographic camera as claimed in claim 1, further including means at an other side opposite the one side of a photographic film having a magnetic surface for urging the film into contact with said head.

3. A photographic camera as claimed in claim 2, wherein said urging means is effective to urge the film into engagement with said head only during transport of the film.

4. A photographic camera as claimed in claim 3, wherein said urging means comprises a complient pressure pad movable into engagement with the film.

5. A photographic camera as claimed in claim 4, further including:
   a pivotal lever carrying said pressure pad;
   means for biasing said pivotal lever to a first position to urge said pressure pad into engagement with the film; and
   means for moving said pivotal lever to a second position to disengage said pressure pad from the film.

6. A photographic still camera as claimed in claim 5, wherein said pivotal lever is in said first position during film transport and in said second position during film exposure.

7. A photographic still camera for transporting a photographic film over an exposure opening to expose frames of the film, the film having a magnetic surface for magnetically recording information on the film, said camera comprising:
   a camera body having an exposure opening;

a magnetic head;

means for supporting the magnetic head to engage the magnetic surface; and

8. A photographic still camera for transporting a photographic film over an exposure opening to expose frames of the film, the film having a magnetic surface for magnetically recording information on the film, said camera comprising:

a camera body having an exposure opening;

a magnetic head;

means for supporting the magnetic head to engage the magnetic surface;

movable means having a first position for engaging and urging the film into engagement with said head and a second position wherein said means is out of engagement with the film; and means for moving said movable means to its first position during film transport and to its second position before film exposure.

9. A photographic still camera as claimed in claim 8 wherein said movable means comprises a movable pressure pad.

10. A photographic still camera as claimed in claim 9 further including a film platen supported to engage the film and retain it in an exposure plane adjacent said opening.

11. A photographic still camera for transporting a photographic film over an exposure opening to expose frames of the film, the film having a magnetic surface for magnetically recording information on the film, said camera comprising:

a camera body having an exposure opening;

means for advancing the film relative to the opening frame by frame;

a magnetic head;

means for supporting the magnetic head to engage the magnetic surface;

movable means having a first position for engaging and urging the film into engagement with said head and a second position wherein said means is out of engagement with the film; and means coupled to said transport means for moving said movable means from its first position to its second position near the end of advance of a film frame.

12. A photographic camera as claimed in claim 11 further including shutter means including a shutter release means for opening said shutter means to expose a film frame aligned with said opening; and means coupled to said shutter release means for moving said movable means from said second position to said first position at the end of the exposure of the film frame.

13. A photographic camera as claimed in claim 12 wherein said movable means comprises a pressure pad.

14. A photographic camera as claimed in claim 13 wherein said movable means comprises a pivotal lever carrying said pressure pad; and means for biasing said lever toward its first position.

15. A photographic camera as claimed in claim 14 wherein said means coupled to said transport means comprises a cam for displacing said lever against the bias of said biasing means to said second position.

16. A photographic camera as claimed in claim 15 further including releasable means for latching said lever in said second position, said means coupled to said shutter release means being adapted to release said releasable means at the end of exposure of a film frame.

17. A photographic still camera including transport means for transporting a photographic film having a magnetic surface on which information may be recorded, the improvement comprising:

a magnetic head; and means for effecting head-to-film contact between said magnetic head and the magnetic surface of the photographic film adequate for reliable recording, only during film transport.

18. A photographic still camera as defined in claim 17, further comprising:

exposure means for exposing the film; and means for discontinuing said head-to-film contact to prevent distortion of the film before exposing the film.

* * * * *